United States Patent [19]

Gordon

[11] 3,849,052

[45] Nov. 19, 1974

[54] PIPE BELLING MACHINE

[76] Inventor: John Gordon, 520 Lancaster Ave., Frazer, Pa. 19355

[22] Filed: July 19, 1973

[21] Appl. No.: 380,540

[52] U.S. Cl.................... 425/387, 425/393, 65/296, 72/370, 264/290 R
[51] Int. Cl............................................ B29c 17/07
[58] Field of Search .......... 425/392, 393, 384, 387, 425/402; 264/291, 290 R, 88; 65/277, 282, 283, 296, 299; 72/117, 370, 367

[56] References Cited
UNITED STATES PATENTS

| | | | |
|---|---|---|---|
| 3,021,571 | 2/1962 | Jackson et al. | 264/88 |
| 3,205,535 | 9/1965 | Niessner et al. | 425/392 X |
| 3,242,548 | 3/1966 | Diller et al. | 425/392 X |
| 3,672,804 | 6/1972 | Dalik | 425/393 X |
| 3,689,190 | 9/1972 | Breitfuss | 425/392 |

Primary Examiner—Robert L. Spicer, Jr.
Attorney, Agent, or Firm—Karl L. Spivak, Esq

[57]  ABSTRACT

A pipe belling machine of elongated frame construction which employs a plurality of chain conveyors which function transversely of the machine to carry previously cut plastic pipes across the machine surface. The chain conveyors carry spaced pins and are periodically functioned to transversely index the pipes in spaced increments. A continuously operating moving belt is associated with each chain conveyor. The continuous motion of the belts results in continuously rotating each length of plastic pipe as it is indexed across the device. One end of each plastic pipe is directed beneath infra-red heaters which are arranged in three heating stations. The heaters soften the pipe ends for pipe belling purposes as the pipes are conveyed across the device. A belling station receives the pipes from the third heating station and includes a power operated mandrel to press a predesigned shape onto each previously heated pipe end. The conveyors move in spaced increments from the initial station, through the three heating stations to the belling station in response to limit switches which are activated by the introduction of additional lengths of pipe into the receiving station.

24 Claims, 12 Drawing Figures

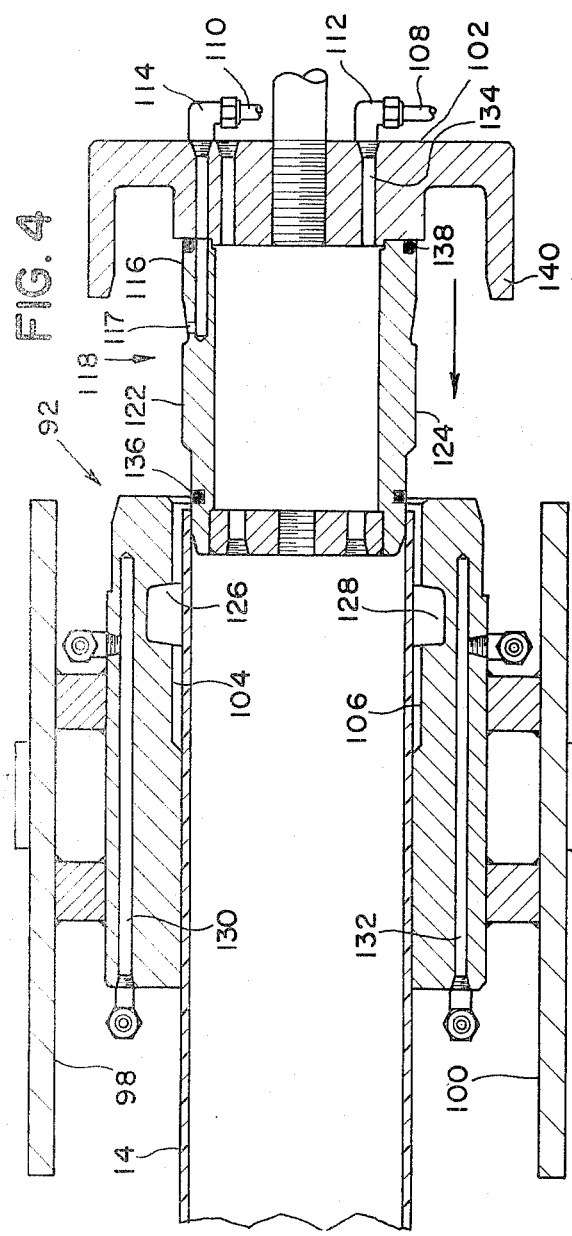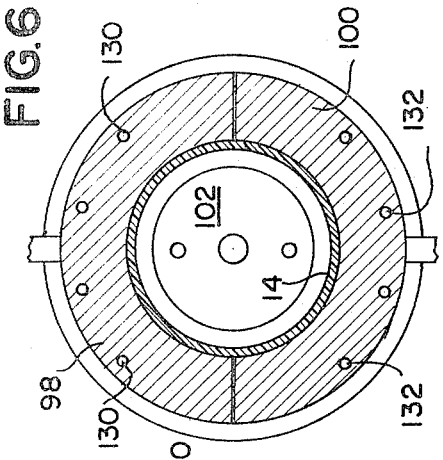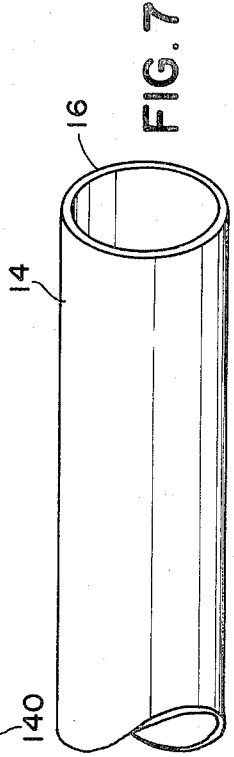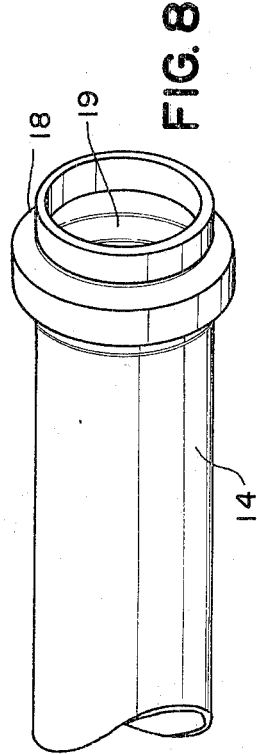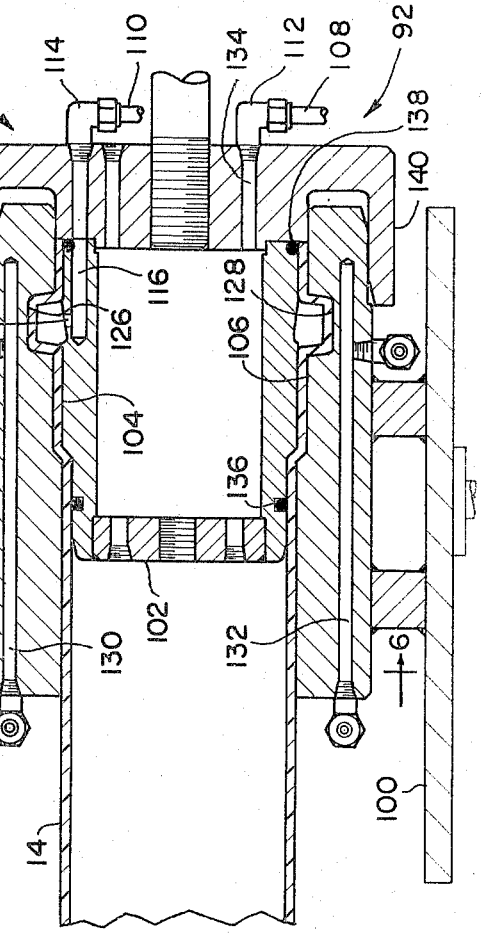

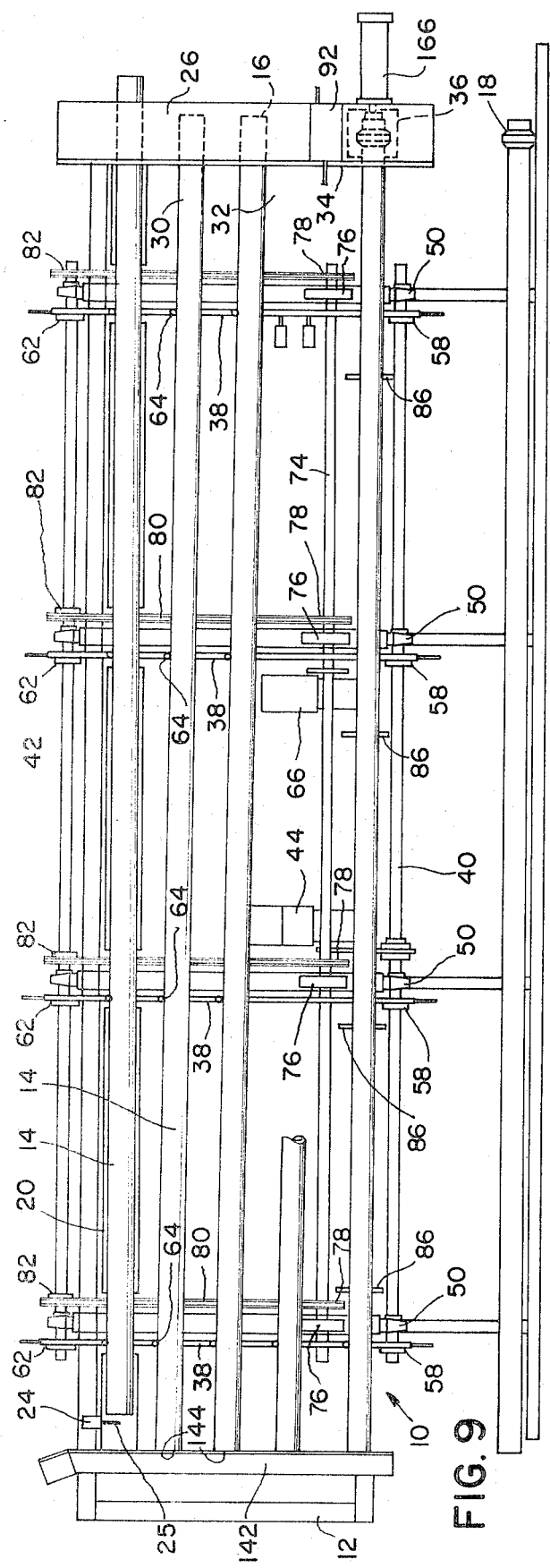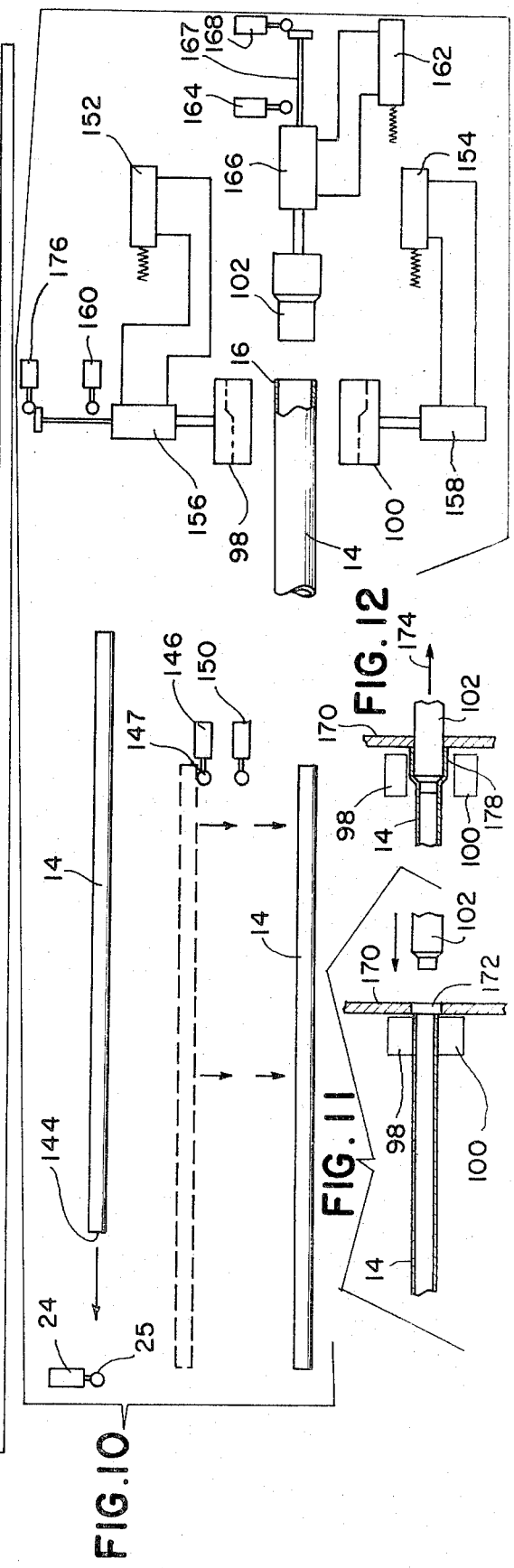

PIPE BELLING MACHINE

BACKGROUND OF THE INVENTION

This invention relates generally to the field of plastic pipe working machines, and more particularly is directed to a plastic pipe belling machine suitable to impress a bell shape on one end of a length of plastic pipe.

The use of plastics such as ABS, PVC and other plastic materials for conveying liquids within pipes for various purposes is becoming increasingly popular throughout the world. As plastic fabricating techniques and pipe forming equipment have improved in quality and availability, the reliability of such material has resulted in a gradual increased acceptance by specifying engineers, by code officials and by the purchasing public in general.

In view of the greatly expanded use of the plastic piping materials, it has become increasingly important to develop efficient, reliable and automatic plastic pipe working machinery to enable production to keep pace with the demand. In this regard, automatically operating machinery has been developed by prior workers in the areas of automatic extrusion equipment, automatic cutting equipment, automatic perforating machines, chamfering equipment and similar production type designs to facilitate and expedite the production and processing of plastic pipes. With regard to pipe belling procedures in particular, prior workers in the field have generally incorporated many hand operations in the procedure. These present methods have accordingly proven to be too slow and too costly in view of the increased demand.

SUMMARY OF THE INVENTION

The present invention relates generally to the field of plastic pipe working machines and more particularly is directed to a novel plastic pipe belling machine capable of automatically preheating and rapidly shaping the ends of previously cut lengths of plastic pipe.

The pipe belling machine of the present invention includes a frame of generally elongated configuration having a plurality of chain conveyors functioning transversely thereof in unison to carry previously cut lengths of plastic pipe transversely across the frame toward a belling station. The chain conveyors include a plurality of spaced pins which function to push successive lengths of pipe upwardly along a slightly inclined path toward the belling station. A plurality of transversely positioned moving belts are associated with the chain conveyors and are wired for continuous operation during all periods when the machine is in use. The previously cut lengths of plastic pipe rest upon the moving belts as they are indexed across the machine so that the belts rotate each length of pipe continuously as it is conveyed across the machine by the chain conveyor.

The belling machine comprises five stations, the first one of which is the receiving station which receives pipes from an extruder after it is cut to length by a cutting saw. The next three stations are heating stations wherein one pipe end is indexed beneath an infra-red heater in a manner to permit the one end of the pipe to be continuously heated as the pipe is indexed and rotated. The final station is the belling station where a power operated mandrel presses a predetermined shape onto each previously heated end. The shape can be of any desired configuration which would be controlled by the design of the mandrel and jaws. Suitable controls are provided in the nature of limit switches, micro-switches and the like to control the function of the chain conveyors, the power mandrel and time of operation of the belling cycle. In a first mode, a plain bell shape can be applied whereby a stripping plate is employed to facilitate withdrawing the mandrel from the newly shaped end. In a second mode, an inwardly facing groove suitable for receiving a gasket can be formed whereby upper and lower mold sections are utilized, but no stripping plate is required.

It is, therefore, an object of the present invention to provide an improved plastic pipe belling machine of the type set forth.

It is another object of the present invention to provide a novel plastic pipe belling machine which incorporates a plurality of transversely functioning chain conveyors and a plurality of transversely functioning belts, the conveyors serving to index previously cut lengths of plastic pipe across the machine and the belts serving to continuously rotate the plastic pipes.

It is another object of the present invention to provide a novel automatic plastic pipe belling machine which includes a frame, chain means carried by the frame to convey lengths of plastic pipe transversely across the machine, belt means which serve to continuously rotate the plastic pipe within the machine, heater means arranged at one end of the machine to continuously heat one end of each length of plastic pipe as it is indexed across the machine and power mandrel means to impress a bell shape onto the previously heated end of each length of plastic pipe.

It is another object of the present invention to provide a novel plastic pipe belling machine which includes a plurality of chain conveyors having spaced pins projecting outwardly therefrom, the chain conveyors functioning to push previously cut lengths of plastic pipe upwardly along an inclined path toward a power mandrel; continuously movable belts supporting the pipes and continuously rotating the pipes as they are traversed across the machine; infra-red heaters arranged at one end of the machine to continuously heat one end of each length of pipe as it is rotated and indexed; and a power mandrel including separable clamps to securely hold and impress a desired shape upon the previously heated end of each length of plastic pipe.

It is another object of the present invention to provide a novel plastic pipe belling machine that is rugged in construction, automatic in operation and trouble free when in use.

Other objects and a fuller understanding of the invention will be had by referring to the following description and claims of a preferred embodiment thereof taken in conjunction with the accompanying drawings, wherein like reference characters refer to similar parts throughout the several views and in which:

BRIEF DESCRIPTION OF THE DRAWINGS

FIG. 4 is an enlarged, sectional view showing the pipe belling mandrel in initial position.

FIG. 5 is a view similar to FIG. 4 showing the pipe belling apparatus in final position.

FIG. 6 is a cross-sectional view taken along Line 6—6 of FIG. 5, looking in the direction of the arrows.

FIG. 7 is an enlarged, perspective view showing the end of a plastic pipe prior to treatment.

FIG. 8 is an enlarged, perspective view of the end of the plastic pipe of FIG. 7 after the pipe belling operation has been completed.

FIG. 9 is a top plan view of the apparatus of FIGS. 1 and 2.

FIG. 10 is a schematic diagram showing the control apparatus of the pipe belling machine.

FIG. 11 is a schematic, partial view on reduced scale showing a second mode of operation in initial position.

FIG. 12 is a view similar to FIG. 11 showing the second mode of operation in second position.

DESCRIPTION OF THE PREFERRED EMBODIMENT OF THE INVENTION

Figure 1:
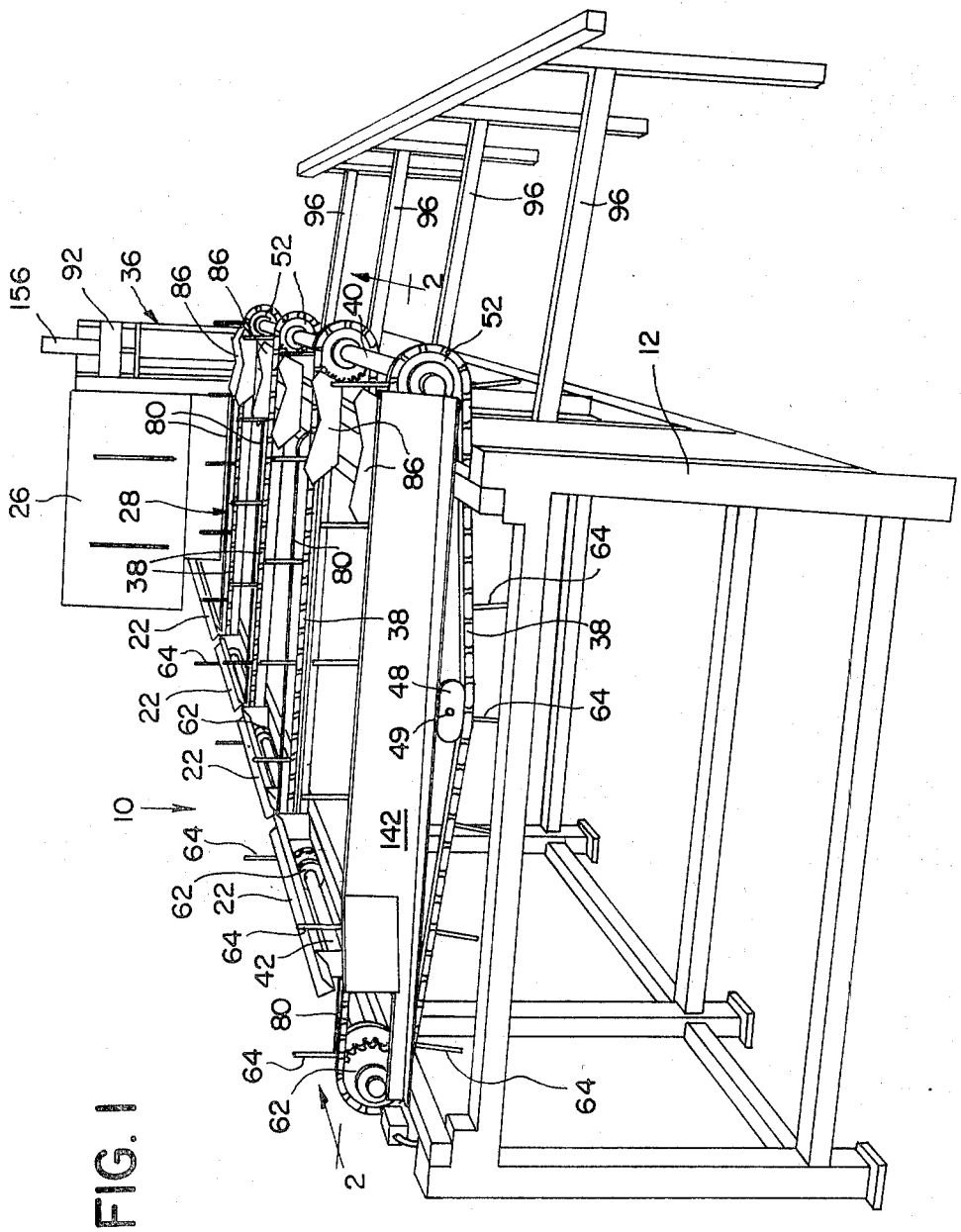
FIG. 1 is a perspective view of the invention.

Although specific terms are used in the following description for the sake of clarity, these terms are intended to refer only to the particular structure of my invention selected for illustration in the drawings, and are not intended to define or limit the scope of the invention.

Referring now to the drawings, I show a pipe belling machine generally designated 10 which includes a structural steel frame 12 of suitable design and of sufficient strength to support the accessory equipment which is employed in the manner hereinafter more fully described for transporting and belling plastic pipes 14. The machine 10 functions to automatically receive previously cut and extruded lengths of plastic pipe 14 from an extruder (not shown) and to transform a plain end 16 as in FIG. 7 to a belled end 18 as in FIG. 8 for pipe joining purposes such as to receive the spigot end (not shown) of another length of pipe in a leak proof and structurally secure pipe junction.

Lengths of previously cut plastic pipe 14 are received on the machine 10 at the generally V-shaped receiving station 20 which may be in the form of a V-shaped, longitudinally extending trough 22. The previously cut lengths of plastic pipe 14 are fed onto the receiving station 20 by the extruder or other equipment (not shown) until the pipe end contacts a forward micro switch 24 to activate the indexing mechanism in the manner hereinafter more fully set forth. An infra-red heater 26 is carried upon one end of the frame 12 and is arranged to direct heat downwardly onto the inclined working surface 28 for pipe end heating purposes. If desired, the heater 26 may be arranged on vertically adjustable supports 27, 29 in conventional manner to permit the distance between the pipe and the heater to be varied.

The apparatus includes three transversely juxtaposed heating stations 30, 32, 34 wherein one plain end 16 of each length of plastic pipe 14 is held beneath the infra-red heater 26 to soften the pipe prior to entering the pipe belling station 36. Thus, by providing three heating stations 30, 32, 34 and one length 14 will be heated three times as long as the time required for the belling cycle. This assures adequate application of infra-red heat to properly soften the pipe end 16 to facilitate the belling operation.

Figure 2:
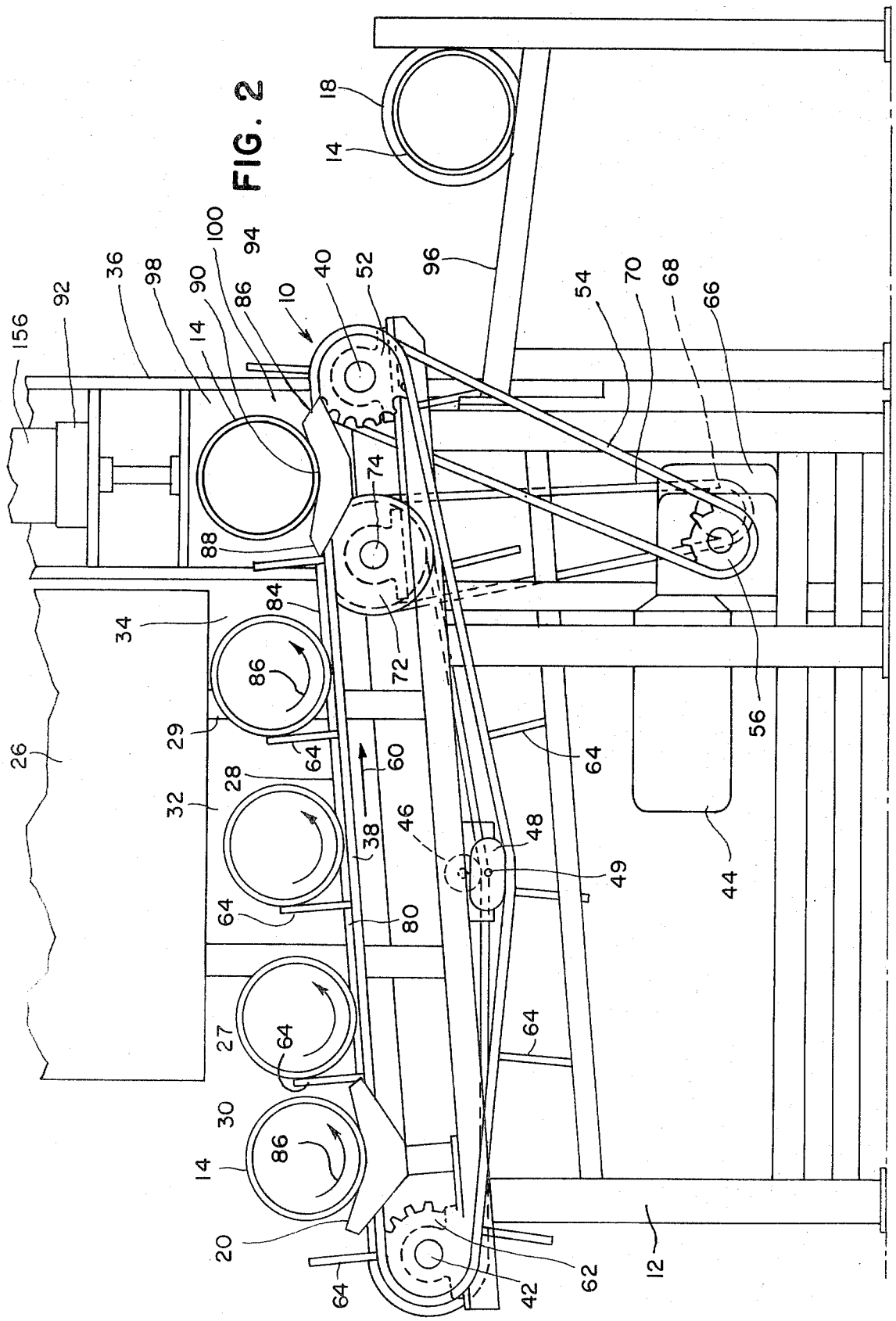
FIG. 2 is an enlarged, cross-sectional view, taken along Line 2-2 of FIG. 1, looking in the direction of the arrows.
Figure 3:
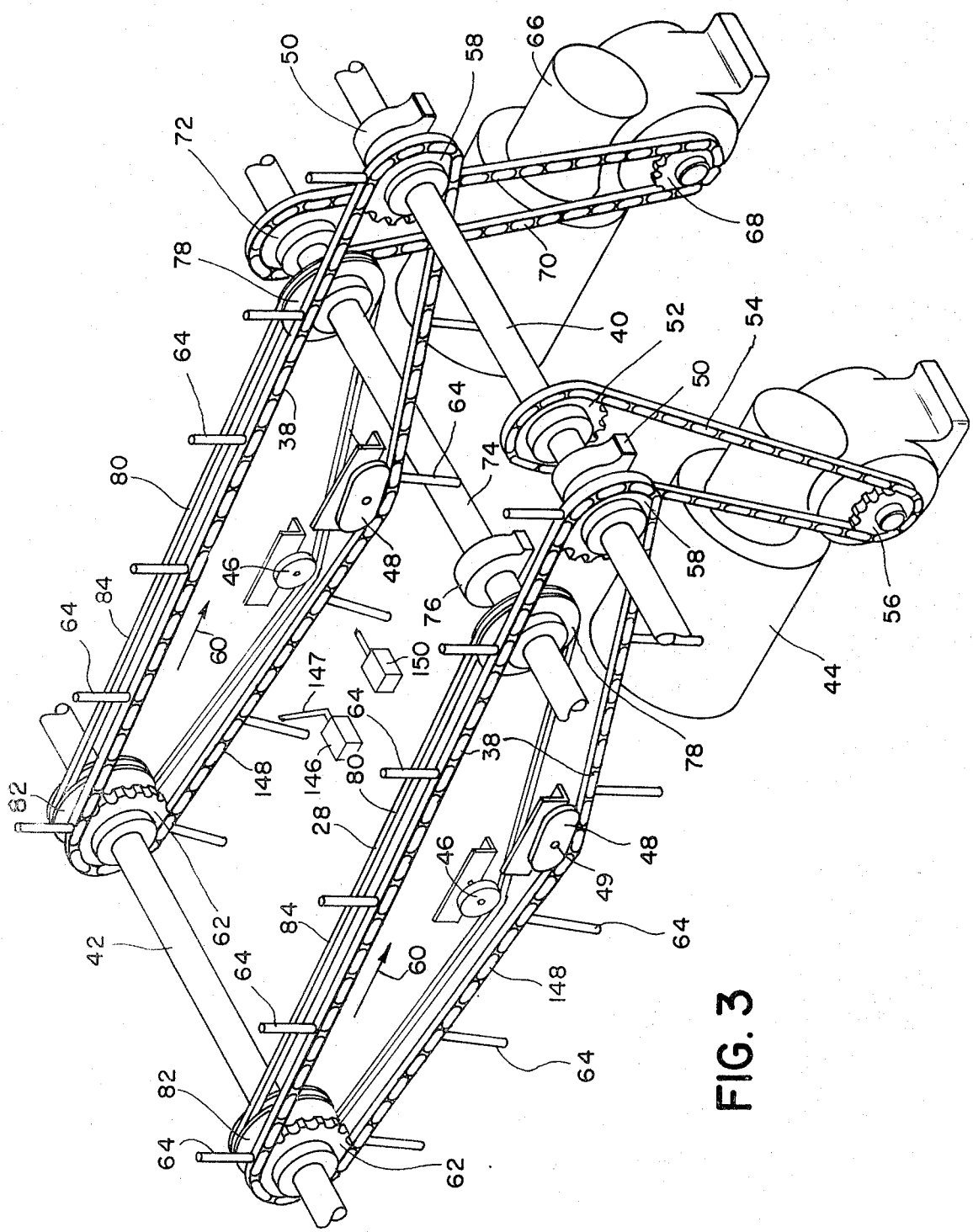
FIG. 3 is an enlarged, partial, perspective view showing the drive apparatus of the pipe belling apparatus.

As best observed in FIGS. 1, 2 and 3, the plastic pipes 14 are indexed transversely across the pipe belling machine 10 by a plurality of longitudinally spaced chain conveyors 38. Each chain conveyor rotates between a driving shaft 40 and an idler shaft 42 to convey the pipes 14 transversely in response to operation of the gearmotor 44. A tensioner 48 which is affixed to a portion of the frame 12 by a bolt 49 may be employed in conventional manner to maintain chain tension. Preferably, the chain links are joined by rollers to facilitate movement over the tensioner 48. A plurality of longitudinally spaced, pillow block bearings 50 affix to the frame 12 to rotatively journal the driving shaft 40 in the usual manner. A driving sprocket 52 is pinned or otherwise securely fastened to the driving shaft 40 and receives the drive chain 54 in driving engagement. The gearmotor 44 powers a drive sprocket 56 which acts to rotate the drive chain 54 upon activation of the gearmotor 44. Power rotation of the driving shaft 40 causes simultaneous rotation of the chain drive sprocket 58 which is also pinned or otherwise affixed to the driving shaft 40.

Referring still to FIG. 3, it will be observed that the chain conveyors 38 mesh with the chain drive sprockets 58 to thereby function in the direction of the arrows 60 upon power rotation of the driving shaft 40. The chain idler sprocket 62 meshes with the chain conveyor 38 and rotates about the idler shaft 42 upon function of the chain conveyors 38. Each chain conveyor 38 is provided with a plurality of outwardly projecting pins 64 which are spaced about the length of the entire chain conveyor 38 in spaced increments equal to the distance between the various heating stations 30, 32, 34, the pipe belling station 36 and the receiving station 20. In this manner, as the chain conveyors 38 are indexed transversely across the pipe belling machine 10, the spaced pins 64 will serve to urge the lengths of plastic pipe 14 into the various stations 30, 32, 34, 36.

A second gear motor 66 is bolted or otherwise secured to the frame 12 and powers a driving sprocket 68 in continuous manner. The driving sprocket 68 is in mesh with a second endless drive chain 70 which meshes with and rotates a belt drive sprocket 72. The belt drive sprocket is pinned or otherwise affixed to the belt driving shaft 74 to thereby rotate the shaft 74 upon function of the second gearmotor 66. The shaft 74 is arranged longitudinally of the machine 10 and generally parallel to and spaced from the chain driving shaft 40. The belt driving shaft 74 rotates within pillow block bearings 76 which are conventionally bolted or otherwise secured to the machine frame 12. A plurality of drive pulleys 78 are rigidly affixed to the belt driving shaft 74 and are rotated when the shaft 74 is rotated upon function of the gearmotor 66. An endless belt 80 is rotatively driven by the drive pulley 78 in the same direction as indicated by the arrow 60 and revolves the idler pulley 82 which is rotated about the idler shaft 42 by rotation of the endless belt 80. If desired, a tensioning pulley 46 may be affixed to the machine frame for belt tensioning purposes. As best seen in FIG. 2, it will be observed that the upper path 84 of the endless belt 80 forms the inclined working surface 28 upon which the various lengths of plastic pipe 14 rest as they are indexed across the machine 10 by means of the chain conveyors 38.

In operation, as each previously cut length of plastic pipe 14 is fed through the receiving station 20 by the extruder (not shown), or other pipe manufacturing apparatus, the forward end of the pipe activates the micro switches 24, 25. The micro switches 24, 25 control the function of the gear motor 44 for a predetermined interval of time to index the chain conveyors 38 a distance equal to the width of one station 30, 32, 34, 36. The upper path 84 of the endless belt 80 inclines upwardly toward the pipe belling station 36 from the receiving station 20 in a path that upwardly inclines at an angle of approximately 1°. Thus, as the chain conveyors 38 carry the pipes 14 transversely across the pipe belling machine 10, the angle of inclination of the inclined working surface 28 serves to roll the pipes downwardly along the inclined surface so that each pipe within the machine will rest against one of the spaced pins 64 at all times. As the chain conveyors 38 are indexed by successive operations of the micro switch 24, the pins 64 act to move each length of plastic pipe 14 into the next succeeding station 30, 32, 34, 36. As previously stated, the second gearmotor 66 continuously operates to continuously revolve the endless belts 80. As best observed in FIG. 2, the various lengths of plastic pipe 14 rest directly upon the endless belt 80 are supported thereby. Thus, as the endless belts 80 continuously rotate in the direction of the arrow 60, each of the pipes 14 will be rotated in the direction indicated by the arrows 86. The continuous rotation of the pipes 14 causes the plain ends 16, which are rotated beneath the infra-red heater 26 in the heating stations 30, 32, 34, to continuously rotate beneath the infra-red heater 26 to uniformly and continuously heat the entire periphery of the plain ends 16 to assure uniform application of heat and to overcome the inherent heat resistance of plastic piping materials such as polyvinylchloride. The continuous heating and rotating of the pipe end acts to work or knead the plastic material, especially as it becomes softer, to thereby aid the belling functions of the mandrel and mold.

The pipe belling station 36 is equipped with a plurality of longitudinally spaced pipe positioners 86 which are machined to provide an upwardly inclined receiving surface 88 and a centrally positioned trough 90 which serve to align each length of pipe 14 with the pipe belling apparatus 92 for pipe belling purposes. The pipe positioners include a downwardly inclined discharging surface 94 which urges the pipes 14 downwardly onto the downwardly inclined finished product table 96 which is fabricated preferably of structural steel of sufficient size to store a plurality of finished pipes 14 after the belled end 18 has been impressed by the pipe belling apparatus 92.

As best seen in FIGS. 4, 5 and 6, the pipe belling apparatus 92 comprises an upper mold section 98, a lower mold section 100 and a horizontally movable mandrel 102. The upper mold section 98 is vertically reciprocal above the center line of the pipe 14 and the lower mold section 100 is vertically reciprocal below the center line of the pipe 14. Each mold section 98, 100 is machined or otherwise provided with a shaped recess 104, 106 of the configuration desired to fabricate the belled end 18 of the plastic pipe 14. The power mandrel 102 is preferably air assisted by means of air tubing 110 and suitable fittings 114 which control the flow of air for pipe shaping purposes within the interior air passages 116 of the mandrel 102. The power mandrel 102 is movable from an initial position 118 as in FIG. 4 to a press position 120 as in FIG. 5. When a plain bell pipe end (not illustrated) is to be formed, the shaping areas 122, 124 of the mandrel 102 cooperate with the shaped recesses 104, 106 in the mold sections 98, 100 to press the desired configuration into the previously heated end of each length of pipe 14. When the belled end 18 is designed with a peripheral groove to receive a gasket (not shown), the mold sections 98, 100 must be formed to the desired shape by incorporating grooved recesses 126, 128. When the mandrel is activated to the press position 120 of FIG. 5, air under pressure enters the mandrel through the air tubing 110 and applies air pressure to the heated pipe material at the grooved recesses 126, 128 by traveling through the interior air passages 116, 117. The air under pressure forms the peripheral groove 19 in the pipe walls as best seen in FIG. 5. Preferably, the parts are water cooled by means of the water passages 130, 132 in the mold sections and by means of the water tubing 108, water tube fitting 112 and water passage 134 in the mandrel.

Referring still to FIGS. 4 and 5, I show the mandrel 102 provided with a forward O-ring gasket 136 and a rearward O-ring gasket 138 which are employed for internal pressure sealing purposes. When the mandrel is urged to its press position 120, the forward and rearward O-ring gaskets 136, 138 forwardly and rearwardly seal the mandrel to prevent escape of air pressure thereabout. Accordingly, substantially all of the air pressure introduced at the fitting 114 is available for peripheral groove 19 forming purposes at the grooved recesses 126, 128. The mandrel is provided with a circumferential lock 140 which serves to securely lock the rearward ends of the mold sections 98, 100 when the mandrel is urged to its press position 120. See FIG. 5. In this manner, when the mandrel is fully pushed to its press position 120 for bell forming purposes, the lock 140 counteracts the belling forces which tend to separate the mold sections 98, 100 by securely clamping the mold sections together.

Referring now to FIGS. 1 and 9, the belling machine 10 is provided with an alignment baffle 142 which serves as an end limit against which the unbelled ends 144 of the lengths of pipe 14 abut as the pipes are indexed across the machine 10. The respective driving sprockets 52 of the various drive chain conveyors 38 are carefully positioned on the driving shaft 40 in a manner to arrange the various pins 64 of the conveyors 38 slightly out of alignment with the longitudinal axis of the machine 10. As best seen in FIG. 9, the various chain conveyors 38 are carefully aligned with respect to the frame to lead the ends 16 of the pipes 14 which are under the heater 26 slightly transversely ahead of the unbelled pipe ends 144. In this manner, as the pipes 14 are rotated by the belts 80 in the direction of the arrows 86, the slight transverse misalignment, together with the forces generated by the angle of incline of the inclined working surface 28 combine to urge the pipe ends 144 against the baffle 142 for longitudinal pipe alignment. Accordingly, any tendency of the pipes 14 to longitudinally wander during the indexing procedures across the machine will be overcome and all pipes will be longitudinally aligned during all periods of operation.

Referring now to FIG. 10, the operation of the machine will now be described. A length of previously cut pipe 14 is fed onto the apparatus and its leading edge 144 is urged into contact with the arm 25 of the micro switch 24. Contact with the arm 25 activates the micro switch 24 and also the timing micro switch 146 to function the gear motor 44. As illustrated in FIG. 3, the arm 147 of the switch 146 aligns with the pins 64 which project from the lower path 148 of a chain conveyor 38. Additionally, the arm 147 is elongated in construction to thereby provide a longer period of contact with a pin 64 as the conveyor 38 is indexed upon function of the gearmotor 44. The micro switches 24, 146 are wired in parallel and are both activated upon contact of the pipe end 144 with the arm 25. The switch 146 functions to continue operation of the gearmotor 44 until the pin 64 rides entirely past the elongated arm 147. By varying the length of the arm 147, the period of conveyor travel upon each indexing can be carefully controlled.

Movement of the conveyors 38 causes a pin 64 to trip the micro switch 150 which activates the upper and lower solenoids 152, 154. The solenoids 152, 154 in turn function the upper mold section cylinder 156 and lower mold section cylinder 158 to close the mold sections 98, 100 about the preheated pipe end 16. Opration of the upper mold cylinder 156 trips the mandrel switch 160 to activate the mandrel solenoid 162 which functions the cylinder 166 to drive the mandrel 102 forwardly for pipe belling purposes. The forward movement of the cylinder 166 plunger activates the timer 164 for a predetermined period of time necessary to impress a permanent bell shape upon the previously heated pipe end 16. When the cycle of operation of the mandrel 102 is timed out by the timer 164, the mandrel is withdrawn by the cylinder 166 until the plunger 167 contacts the rear limit switch 168 to open the mold sections 98, 100. At this point, the machine would be ready for the next cycle of operation as initiated by contact of the next length of pipe 14 introduced at the receiving station 20 with the micro switch arm 25.

In a first mode of operation, for example when a peripheral groove 19 is being molded as illustrated in FIGS. 4, 5 and 8, the mold sections 98, 100 remain closed and the mandrel 102 withdraws to strip from the pipe end 16. The peripheral groove 19 serves to retain the pipe in association with the mold sections. The withdrawal of the mandrel 102 activates the switch 160 to open the mold sections 98, 100. In a second mode of operation as illustrated in FIGS. 11 and 12, a bell end is formed in the pipe 14 without any peripheral groove 19. In this instance, a stripper plate 170 with an aperture 172 in alignment with the mandrel 102 is employed. After forming a bell end without a groove 19, the mold sections 98, 100 first open and then the mandrel 102 is withdrawn in the direction of the arrow 174. The opening of the mold sections 98, 100 activates the micro switch 176 which in turn functions the solenoid 162 to withdraw the mandrel 176. It is noteworthy that the aperture is fabricated just large enough to permit passage of the mandrel 102 but not large enough to allow the belled end 178 of the pipe to pass therethrough. Thus, when the mandrel 102 is moved in the direction of the arrow 174, the stripper plate 170 acts to strip the mandrel from the newly formed bell shaped pipe end 178.

Although I have described my invention with a certain degree of particularity, it is understood that the present disclosure has been made only by way of example and that numerous changes in the details of construction and the combination and arrangement of parts may be resorted to without departing from the scope of the invention.

I claim:
1. In a pipe belling machine, the combination of
  A. a frame having a longitudinal axis,
     1. said frame having an inlet end and a remote end;
  B. a pipe receiving station supported by the frame,
     1. said pipe receiving station receiving lengths of previously cut pipes from a source exterior of the machine;
  C. a heater mounted at the inlet end of the frame,
     1. said heater defining at least one pipe end heating station;
  D. a chain conveyor functioning transversely of the said longitudinal axis,
     1. said conveyor including means to urge the pipes transversely across the frame,
     2. a portion of each said pipe being positioned within the heating station for pipe end heating purposes as the pipe is urged across the frame;
  E. a belt rotative about the frame and having an upper path and a lower path of travel,
     1. the said pipes resting upon the upper belt path and being rotated thereby upon operation of the belt; and
  F. a belling station receiving the pipes from the heating station,
     1. said belling station including means to impress a bell shape upon the previously heated end of the pipe.

2. The invention of claim 1 wherein the chain conveyor means include a plurality of spaced, outwardly projecting pins, each pin contacting a pipe to urge the pipe across the frame in response to conveyor operation.

3. The invention of claim 2 wherein the conveyor moves in timed increments of travel.

4. The invention of claim 3 wherein the belt is an endless belt and herein the belt continuously moves to continuously rotate each pipe within the heating station.

5. The invention of claim 4 wherein the length of travel of the conveyor during each timed increment is equal to the spacing between pins.

6. The invention of claim 1 wherein the upper path of belt travel lies in a plane which upwardly inclines toward the belling station.

7. The invention of claim 4 wherein the chain conveyor means also include a micro switch affixed to the frame in alignment with the path of travel of a pipe introduced into the receiving station, the micro switch being activated by the pipe to initiate an operation of the chain conveyor upon the introduction of each succeeding length of pipe.

8. The invention of claim 7 wherein the heater is fabricated of sufficient length to provide three transversely juxtraposed heating stations.

9. The invention of claim 1 wherein the belling station includes a pair of upper and lower cooperating mold sections, the mold sections having vertical movement relative to the pipe from a molding position to a release position.

10. The invention of claim 9 wherein the belling station further includes a mandrel in alignment with the pipe, said mandrel having axial movement relative to the pipe from an initial position to a press position.

11. The invention of claim 10 wherein the mold sections are formed to include a peripheral, continuous groove and the mandrel is equipped with air introduction channels, the said air channels directing air into the grooves to press portions of the previously heated pipe end into the groove when the mandrel is moved to its press position.

12. The invention of claim 11 wherein the groove retains the pipe in association with the mold sections to permit withdrawal of the mandrel to its initial position.

13. The invention of claim 10 and a stripping plate interposed between the mandrel and the mold sections.

14. The invention of claim 13 wherein the stripping plate is provided with an opening of size to admit the mandrel when the mandrel is moved to its said press position, said opening being small enough for stripping purposes to prevent passage of the end of the pipe when the mandrel is withdrawn to its initial position.

15. The invention of claim 10 wherein the mold sections clamp the pipe when in the molding position to prevent movement of the pipe relative to the mandrel when the mandrel is moved to its belling position.

16. The invention of claim 6 wherein a plurality of longitudinally spaced, identical chain conveyors are provided, the said chain conveyors being driven from the same shaft whereby all conveyors operate in unison at the identical speed.

17. The invention of claim 16 wherein the chain conveyors are arranged upon the machine slightly out of longitudinal alignment.

18. The invention of claim 17 wherein a line drawn through corresponding pins of the conveyors defines a straight line which is slightly angularly offset from the said longitudinal axis.

19. The invention of claim 18 wherein the portion of the line nearest the inlet end of the machine transversely leads the portion of the line nearest the remote end.

20. The invention of claim 19 and an alignment baffle affixed to the frame near the remote end of the machine, the alignment baffle limiting longitudinal movement of the pipes relative to the machine.

21. The invention of claim 20 wherein the angle of incline of the upper path of belt travel and the angle of incline of the straight line through the pins combine to continuously urge the pipes into contact with the alignment baffle.

22. The invention of claim 11 where the mandrel is provided with a circumferential lock, the said lock engaging the mold sections to prevent vertical separation when the mandrel is urged to its press position.

23. The invention of claim 22 wherein the mandrel is provided with a forward air seal and a rearward air seal, the said forward and rearward air seals sealing between the mandrel and the pipe to prevent escape of air when the mandrel is moved to the press position.

24. The invention of claim 23 wherein the forward and rearward seals are each formed of O-ring gaskets.

* * * * *